United States Patent Office 2,870,234
Patented Jan. 20, 1959

2,870,234

ALKALINE STORAGE CELLS WITH CADMIUM TYPE NEGATIVE ELECTRODES

Joseph D. Moulton, West Orange, N. J., assignor to McGraw-Edison Company, Elgin, Ill., a corporation of Delaware No Drawing. Application July 11, 1957
Serial No. 671,146

7 Claims. (Cl. 136—24)

This invention relates to alkaline storage cells of the type which use a cadmium active material in the negative electrodes, and more particularly it relates to an improved cadmium-active material for such cells having a novel addition agent or expander.

The phrase "cadmium active material" is herein used to refer to pulverulent materials composed predominantly of cadmium hydroxide or oxide with or without varying minor proportions of iron active material, and the phrase "iron active material" is used to refer to pulverulent materials composed of substantially equal amounts of finely-divided metallic iron and ferrous oxide. When such cadmium active material is electrolytically reduced—i. e., charged or formed—it becomes principally finely-divided metallic cadmium with or without a small percentage of finely-divided metallic iron depending upon whether iron active material was initially included. It is intended that the phrase "cadmium active material" as herein employed comprehends both its reduced and unreduced states. Further, although negative electrodes of the cadmium type are typically employed with positive electrodes having an active material composed principally of nickel oxide, no unnecessary limitation of the invention in connection with such positive electrodes is intended.

An object of the invention is to provide an improved cadmium active material for alkaline storage cells which is adapted to provide the cells with improved operating characteristics, greater capacity and longer life.

Another object is to provide alkaline storage cells having an improved negative active material of the cadmium type which is adapted to maintain the life of the cells after many cycles of charging and discharging.

A further object of the invention is to provide an improved active material of the cadmium type having therein a new addition agent or expander which is easy and economical to use.

These and other objects and features of my invention will be apparent from the following description:

It is well known in the art of making battery electrodes that certain addition agents or expanders, depending on the type of battery employed, are effective in retarding a densifying of the active material and in giving the batteries therefore better operating characteristics, greater capacity and longer life. The present invention is in the discovery that polyvinylpyrrolidone is a very effective and economical addition agent or expander for the cadmium active material of negative electrodes of alkaline storage cells.

My invention may be carried out using the usual cadmium active material composed of ten parts of cadmium hydroxide or cadmium oxide prepared as by anodic electrolysis of cadmium material in an aqueous alkaline electrolyte, plus about one part of active iron material. The average cadmium content of such hydroxide or oxide is of the order of 75% and the iron content of such iron active material is of the order of 89%. With this cadmium active material there is intimately mixed approximately 1% by weight of polyvinylpyrrolidone on a cadmium metal basis. This new addition agent may be provided in dry form, in which case it is added to the dry cadmium active material and thoroughly mechanically mixed therewith. When added in powder form, about .375% g. of the addition agent is used for each 50 g. of cadmium active material. Alternatively, the polyvinylpyrrolidone may be added in liquid form, in which case about .375 g. of the addition agent is dissolved in 10 ml. of water and this solution is added to about 50 g. of cadmium active material. After this solution is thoroughly mixed with the cadmium active material the mix is dried at about 100° C. overnight and then strained through a 20-mesh screen. The end product is packed under heavy pressure into the pockets of the usual pocketed form of negative electrode with each pocket containing typically about 8 g. of the cadmium active material. Since the mechanical form of such electrodes is well known and the invention is not involved in the mechanical nature of the electrode, the same is not herein shown or described.

In a different verision of the invention the polyvinylpyrrolidone addition agent or expander may be added to plain cadmium active material having no iron active material content. Although the addition of a minor proportion of iron active material to cadmium hydroxide or oxide is well known as providing an improved form of cadmium active material for negative electrodes, the use of a small percentage, of the order of 1% by weight of the cadmium metal, of the present new addition agent to plain cadmium active material is found to have even a greater benefit.

Each storage cell used for testing the present invention may comprise one single-pocket negative electrode and two nickel oxide positive electrodes having excess electrical capacity. Such cell may be tested by repeated charge and discharge cycling wherein each cycle consists of charging the cell for about 15 hours at 500 ma. and then discharging the cell at a current of 400 ma. to a terminal voltage of 1 volt. For comparison purposes, similar cells without the present new addition agent have also been cycled in the same way.

It has been found that with addition of the polyvinylpyrrolidone there is a small loss of the order of about 5% in the initial capacity but that this loss occurs only during the first 8 to 20 cycles. Thereafter, those cells with the addition of the polyvinylpyrrolidone outperform the regular cells of similar construction and size. For example, it is found that as the cycling is continued the relative performance of those with the new addition agent becomes increasingly better, the capacity of the new cells after about 300 cycles being approximately 60% to 70% better. Still further, it is found that the new addition agent is substantially more effective in connection with plain cadmium active material than it is with the more usual cadmium active material including a minor proportion of iron active material. In this connection the capacity of the storage cells with the plain cadmium active material plus the new addition agent is, after about 300 cycles, of the order of 5% to 10% higher than it is with similar cells differing only in that the cadmium active material includes also about 10% by weight of iron active material.

Although the new addition agent of my invention is preferably added to the cadmium active material directly as above described, the invention comprehends the addition of this new agent in other ways as, for example, by adding it directly to the electrolyte.

The description of my invention is intended to be illustrative thereof and not limitative thereof since the

I claim:

1. A negative electrode for alkaline storage cells comprising an intimate mixture of cadmium active material and of polyvinylpyrrolidone as an addition agent in an amount effective to increase substantially the life of the electrode.

2. The negative electrode set forth in claim 1 wherein said cadmium active material is composed predominantly of cadmium hydroxide with a minor proportion of iron active material.

3. The negative electrode set forth in claim 1 wherein the amount of said addition agent is about 1% by weight of the cadmium metal.

4. A dry, pulverulent active material for the negative electrodes of alkaline storage cells consisting essentially of a predominant proportion of a material selected from the group consisting of cadmium hydroxide and cadmium oxide, plus about one percent by weight of the cadmium metal of polyvinylpyrrolidone as an addition agent.

5. A dry, pulverulent active material for the negative electrodes of alkaline storage cells consisting essentially of an intimate mixture of a material selected from the group consisting of cadmium hydroxide and cadmium oxide, plus about ten percent of iron active material and about one percent of polyvinylpyrrolidone as an addition agent.

6. An alkaline storage cell comprising a positive electrode having an active material of nickel oxide, a negative electrode provided with a cadmium active material, an alkaline electrolyte, and an addition agent of polyvinylpyrrolidone in the cadmium active material in an amount effective to increase substantially the life of the negative electrode.

7. An active material for negative electrodes of alkaline storage cells consisting essentially of an intimate mixture of cadmium active material and of a small percentage of polyvinylpyrrolidone as an expander.

References Cited in the file of this patent

UNITED STATES PATENTS 2,519,399   Roberts _____ Aug. 22, 1950